Patented Jan. 19, 1926.

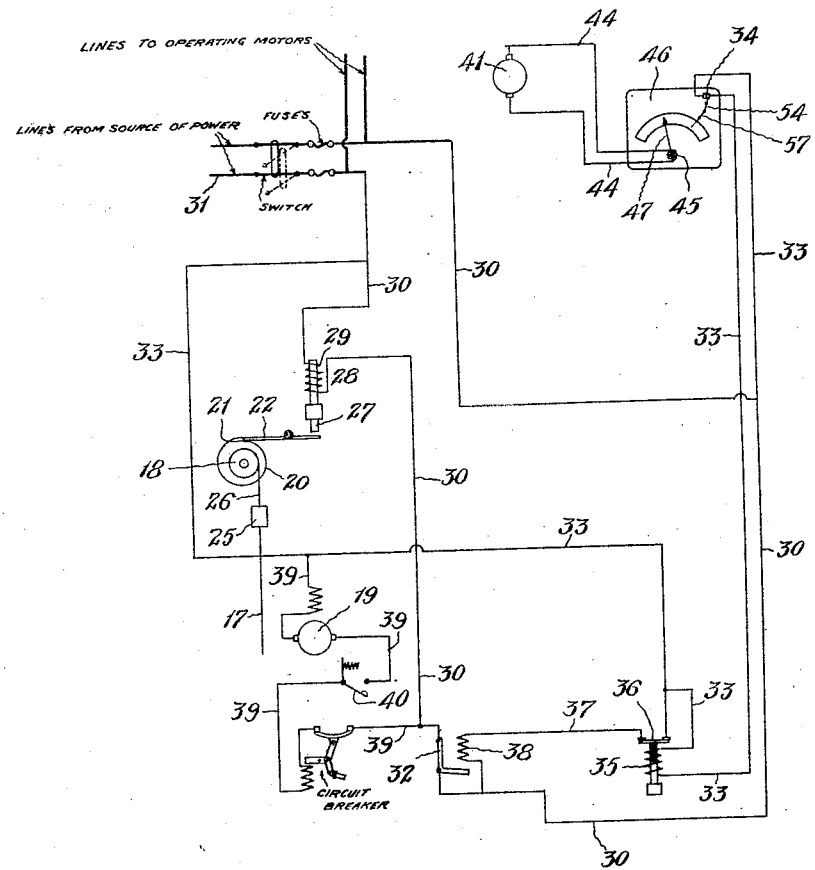

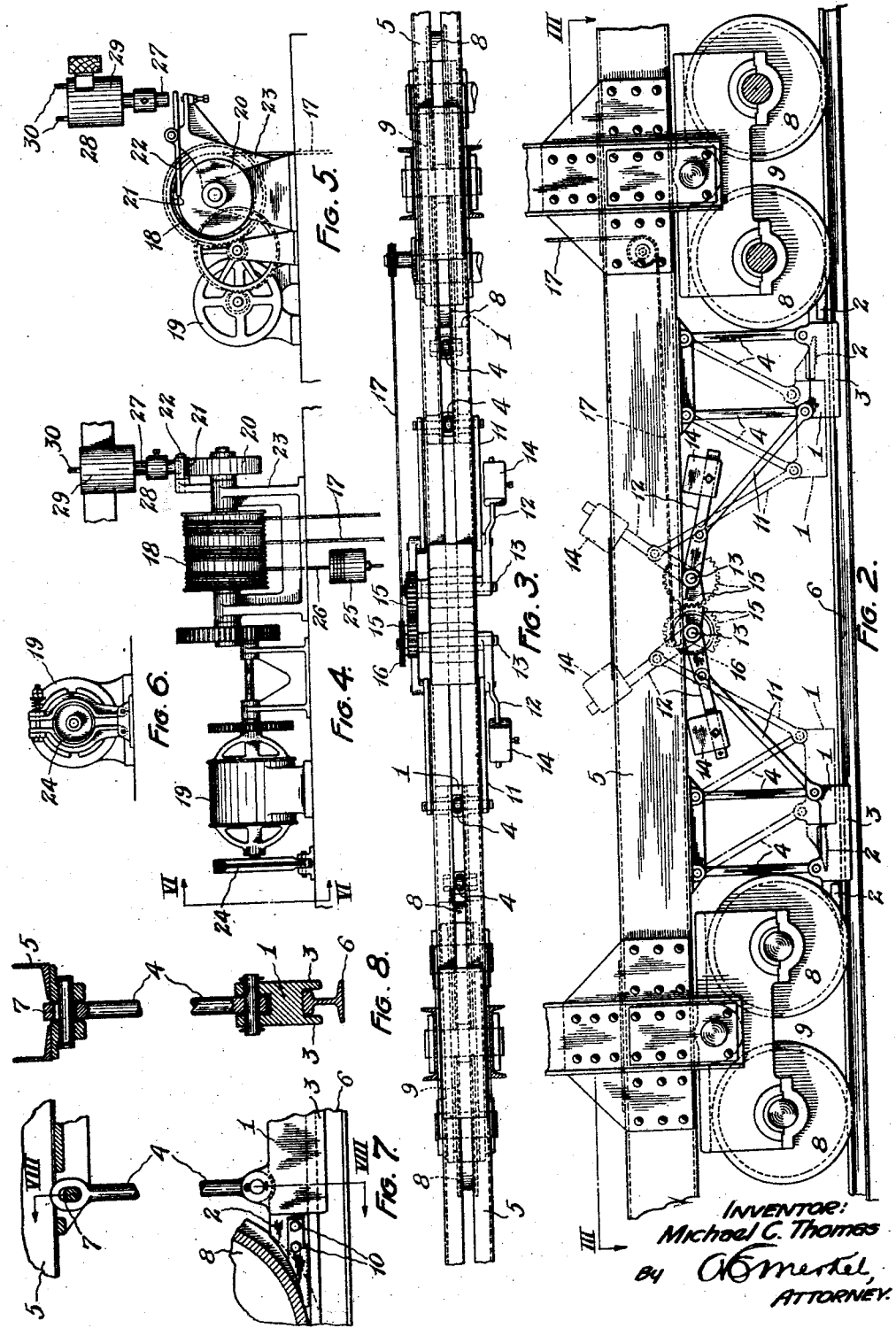

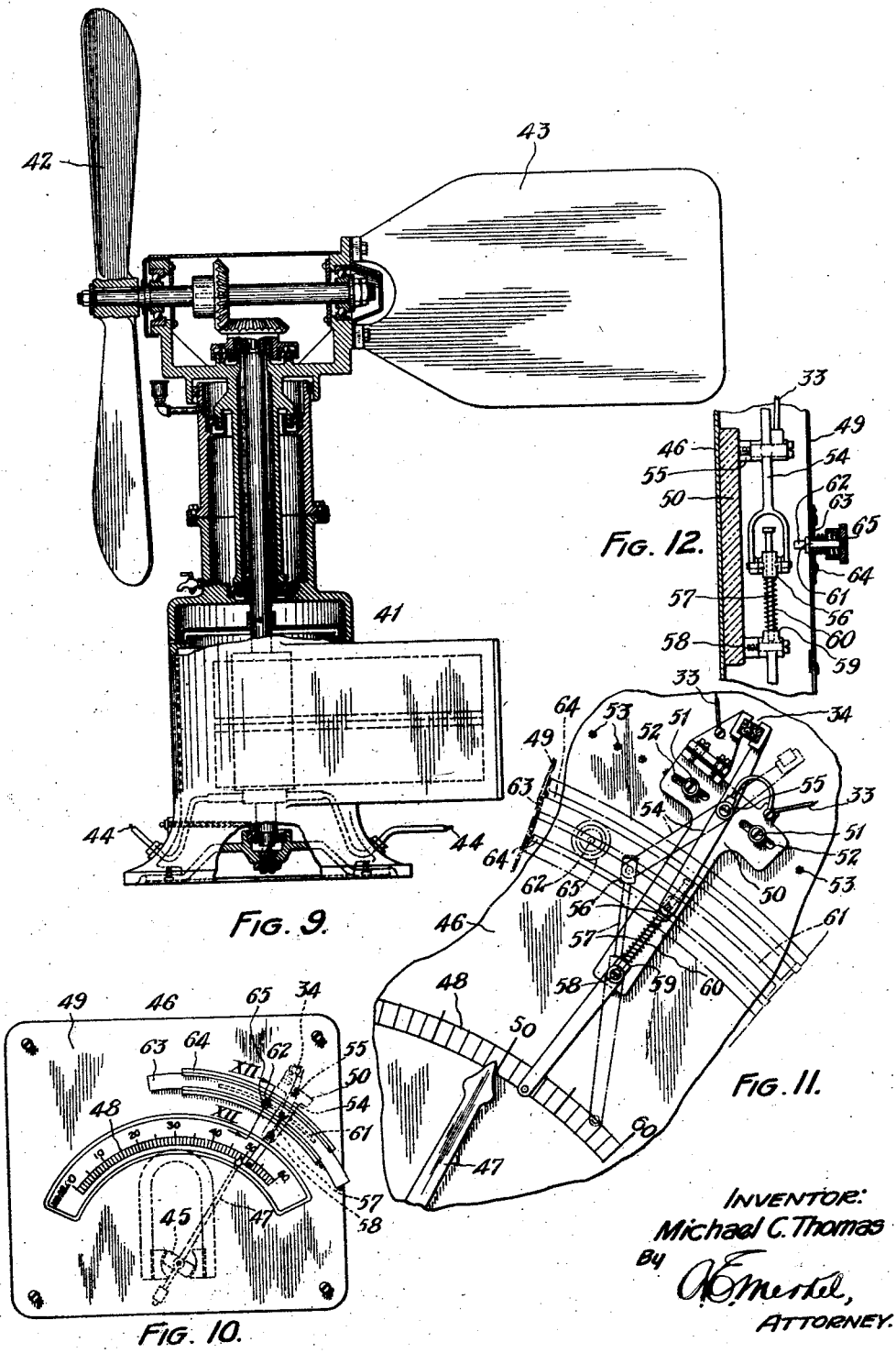

1,570,289

UNITED STATES PATENT OFFICE.

MICHAEL C. THOMAS, OF DETROIT, MICHIGAN.

MEANS FOR LOCKING AN ORE BRIDGE OR THE LIKE AGAINST MOVEMENT RESULTING FROM WIND PRESSURE.

Application filed March 5, 1923. Serial No. 623,071.

*To all whom it may concern:*

Be it known that I, MICHAEL C. THOMAS, a citizen of the United States, resident of Detroit, county of Wayne, and State of Michigan, have invented new and useful Improvements in Means for Locking an Ore Bridge or the like Against Movement Resulting from Wind Pressure, of which the following is a specification, the principle of the invention being herein explained and the best mode in which I have contemplated applying that principle, so as to distinguish it from other inventions.

My invention relates to devices for resisting and preventing the unpremeditated translation of movable devices such as gantry cranes, bridges or the like, upon their tracks, as a result of wind pressure.

The object of my invention is to produce a device of the above described character which will act automatically and efficiently.

The said invention consists of means hereinafter fully described and particularly set forth in the claims.

When a large structure such as an ore-bridge is left standing idle without an attendant, the velocity of the wind is sometimes sufficient and its direction such as to result in an uncontrolled movement of the bridge upon its track, which if not checked results in considerable damage or wrecking of the structure, as is understood by those familiar with this practice.

More specifically, my invention consists of means for automatically checking the wheels of such a movable structure, normally inoperative but rendered operative by means responsive to a predetermined wind pressure. That is when the wind velocity becomes such that it would produce sufficient pressure on the structure to move same upon its track or render same unresponsive to the regular operating mechanism, the checking means are automatically operated to block the wheels and thus lock the structure upon its track.

The annexed drawings and the following description set forth in detail, certain means embodying my invention, the disclosed means, however, constituting but one of various forms in which the principle of my invention may be applied.

In said annexed drawings:—

Fig. 1 represents a diagrammatic representation of various elements of the invention, detached from the structure to which they are applied, including a diagram of the electrical wiring of the system.

Fig. 2 represents a fragmentary side elevation of the lower part of an ore-bridge to which my invention is shown as applied.

Fig. 3 represents a plan of such lower structure part.

Fig. 4 represents a side elevation of an electric motor and cable drum forming part of the invention.

Fig. 5 represents an end elevation of such motor and cable drum.

Fig. 6 represents the other end elevation of such motor.

Fig. 7 represents an enlarged detail fragmentary side elevation of one of the chock-block frames and adjacent parts, partly in section.

Fig. 8 represents a section taken upon the plane indicated by line VIII—VIII, Fig. 7.

Fig. 9 represents a side elevation, partly in section, of the wind-operated electric generator which controls the operation of the chocking mechanism.

Fig. 10 represents a front elevation of a volt meter and attached parts which cooperate with the wind-operated generator to control the operation of the chocking mechanism.

Fig. 11 represents a fragmentary front elevation, enlarged, of the parts back of the front plate of the volt meter.

Fig. 12 represents an enlarged section taken upon the plane indicated by line XII—XII, Fig. 10.

The means for directly resisting translation, in the illustrated embodiment of my invention, includes two chocking blocks 1—1, Figs. 2 and 7. These blocks are respectively mounted upon two shoes 2 each formed with two downwardly extending flanges 3—3 whereby such shoes are adapted to straddle a rail as shown in Fig. 8. Each such shoe articulates with the lower ends of two arms 4—4, whose upper ends are pivoted upon the frame 5 of the ore-bridge directly over one of the rails 6 of the track upon which the bridge travels. The upper bearings 7—7 of said arms are vertically elongated as shown in Fig. 7 and the length and position of the arms are such that when vertical, the shoes will rest upon the track and the blocks project between and engage two of the wheels 8 of the trucks 9, said arms being capable of some upward movement on the pivotal pins passing through bearings 7—7. The blocks are preferably made of hardened steel and are removably secured to the shoes by means of bolts 10 as shown in Fig. 7, so that they may be readily removed for replacement when worn. The bottom surface of each of said blocks is preferably serrated as shown, so as to grip the rail.

By elongating the bearings 7, as described, the required contact of the blocks with the rail, is always assured and wear is compensated for, as will be understood.

Each block is wedge-shaped so that it will properly enter the angular space between the wheel and rail.

As also shown, the blocks are positioned opposite to the adjacent sides of two wheels, so that one of said blocks is adapted to chock one wheel when the structure is moving or attempting to move in one direction and the other to chock the other wheel when the movement or attempted movement is in the other direction.

Each pair of arms 4—4 together with the attached shoe 2 constitutes a swinging frame upon which a chocking block is mounted, and the flanges 3—3 prevent side sway when the blocks are in operative position.

Articulating with said frames respectively, are two links 11—11 whose upper ends articulate with arms 12—12 intermediately of their ends, as shown in Fig. 2. The inner ends of these arms are respectively fixed to two parallel rock shafts 13—13 mounted in suitable bearings fixed to frame 5. The outer or free end of each of said arms 12 carries an adjustable weight 14. The links 11 and arms 12 form toggles which through the medium of weights 14 tend to impel the shoes toward the wheels and hence to insert the blocks between the wheels and rails.

Fixed to one end of each shaft 13 is a gear 15 and these gears mesh with each other as shown in Fig. 3. One of said shafts has also secured thereto a pulley 16 to whose circumference is fixed one end of a cable 17. This cable passes around suitable guiding pulleys and to a drum 18, Fig. 4, which is mounted upon the bridge frame at any suitable location. This drum is connected for rotation, with an electric motor 19 also mounted on said frame, by means of suitable gearing as shown.

One end of the drum shaft carries a disk 20 provided with a stop-shoulder 21 which is engaged by a pawl 22 suitably and pivotally mounted on the frame 23 which carries the drum. The positions of the pawl and shoulder 21 are such that they will lock the drum against rotation or attempted rotation resulting from the pull of the cable derived from the weight of the shoes 2 and their connected parts.

An adjustable brake 24, Fig. 6, is connected with the motor 19, of any well known construction.

During the normal operation of the bridge the cable 17 is wound upon the drum to an extent such that the shoes 2 are swung away from the wheels into the positions shown in dotted lines in Fig. 2, thereby rendering the blocks 1 inoperative.

Should the pawl 22, however, be disengaged from the shoulder 21, the weight of the parts will cause the drum to rotate, unwind the cable and permit the two chocking blocks to simultaneously assume by gravity their operative positions, shown in full lines in Fig. 2.

The brake 24 prevents the too sudden movement of the parts, into such position, as will be understood, thereby preventing possible breakage.

Additional weight may be added in order to overcome the inertia of the rotating parts of the motor and attached elements, by adding a weight 25 supported by an additional cable 26 wound upon said drum 18, as shown in Fig. 4. The brake is adjusted so as to impart the required speed of movement to the gravity-operated parts when they drop as a result of the release of said pawl.

The described parts are caused to reassume their inoperative position by starting the motor as will be hereinafter described, thus rotating the drum and rewinding the cable. A suitable "limit switch" 40, of well known construction is connected in the motor circuit, Fig. 1, which automatically breaks the motor circuit when the required number of revolutions of the drum have been effected to raise the shoes 2 to the required position.

The said pawl 22 is pivoted intermediately of its ends as shown in Fig. 5, and its free end is positioned immediately below a core 27 of a solenoid 28.

The solenoid winding 29 is connected in an electrical circuit 30 which is connected with a main circuit 31, Fig. 1. In this case the circuit 31 of Fig. 1, represents the feed-bars from which current is transmitted to the driving motors (not shown) of the bridge, by means of the usual sliding or rotating contacts (also not shown) carried by the bridge, all as will be readily understood and as is common practice.

As also shown in Fig. 1, the circuit 30 contains a normally closed magnetically-operated switch member 32.

A parallel circuit 33 contains a normally closed switch 34, and a normally closed relay switch coil 35 which normally closes a switch member 36 in a second parallel circuit 37 containing the coil 38 which operates the switch 32.

The motor 19 is connected in a parallel circuit 39 in which the limit switch 40 is connected in series with the motor.

Assuming the various switches to be in their normal described closed positions, let it also be assumed that switch 34 is opened. Such action breaks circuit 33 as a result of which coil 35 is de-energized and switch 36 is opened, circuit 37 broken, coil 38 de-energized, switch 32 opened and circuit 30 broken. The breaking of the said circuit 30 de-energizes coil 29, the core 27 drops and the pawl 22 is disengaged from shoulder 21, (said core being of sufficient weight for such purpose) thus permitting the drum 20 to rotate and the wheels 8—8 to be chocked by blocks 1, as previously described.

Such opening of switch 34 is controlled by means responsive to a predetermined wind velocity, which means I shall now proceed to describe.

Mounted upon the bridge and so located as to be freely exposed to the wind, is a magneto-generator 41, Fig. 9, operated by a wind-actuated propeller 42 mounted so as to be rotatable about a vertical axis and connected with a wind-vane 43. This generator produces an electric current which is transmitted through a circuit 44, Fig. 1, which contains the armature coil 45 of a volt meter 46 provided with an indicating pointer 47 and arcuate dial 48. The voltage of the current generated, will hence be proportional to the velocity of the air current or wind which rotates the propeller.

The volt meter is mounted at any suitable location, preferably, however, in the cage (not shown) provided for the operator of the bridge.

Mounted upon the volt-meter frame and behind the dial-plate 49 is a frame 50 secured in place by means of screws 51 passing through slots 52 and engaging suitable threaded holes 53.

Upon this frame 50 is mounted the previously mentioned switch 34 controlling the circuit 33.

The movable member 54 of this switch is pivoted at 55 and has mounted upon its non-contacting end, an oscillatory bearing 56 through which slides the upper and cylindrical portion of a lever 57 pivoted at 58 upon said frame 50, as shown in Figs. 11 and 12, and having a shoulder 59. A coiled spring 60 is interposed between said shoulder and the bearing 56. The lower end of said lever projects into the path of movement of the pointer 47.

When the switch is closed the lever 57 and member 54 are slightly beyond the plane of their alinement and are held in such position by the spring, as will be understood. When the pointer 47 engages the lower end of the lever, the latter will be moved past the plane of alinement whereupon the spring 60 will effect a quick continuation of such movement and effectually open the switch, as shown in Fig. 11 in dotted lines.

The front or dial-plate is provided with an arcuate slot 61 through which projects a pin 62. This pin is mounted upon a slide 63 mounted in guides 64 fixed to the front face of the plate, and its outer end is provided with a button 65. A coiled spring is interposed between the button and slide, as shown in Fig. 12. By grasping the button and pushing, the inner end of the pin may be projected inwardly so that when the slide is at the same time moved in its guides, the pin will engage the member 54 and move same to restore the switch to its normally closed position.

Additional screw holes 53 are provided for securing the frame 50 in different required positions.

The graduations on the dial are made to indicate wind velocity.

In applying the above described mechanism, that wind velocity is first determined which will produce a force sufficient, if applied in the direction of the track, to move the bridge along the latter. The frame 50 is then set so that when the pointer 47 reaches the position indicating such velocity, it will trip the lever and open the switch 34. Such action, as before explained, will result in the operation of the chocking mechanism and lock the ore-bridge upon its track, until the circuit 33 is re-established by the manual restoration of the closed position of switch 34. This latter will close circuit 33, whereupon switch 36 will close, switch 32 will close and the motor 19 (the limit switch having been automatically closed as will be understood) will rewind the cable and remove the blocks 1 from the track, whereupon the bridge is free to be translated in the course of its normal operation.

It will also be noted from the above described construction, that the mechanism will also be caused to operate whenever the circuit 30 is broken for any cause, as for instance the operation of an automatic circuit-breaker, burning out of a fuse or throwing of a main switch.

What I claim is:

1. In a device of the character described, the combination with normally inoperative means for resisting translative movement of a translatable structure; of means for controlling the actuation of such resisting means including an electrical circuit together with a movable member adapted to control said circuit and itself adapted to be actuated by an electrical current; and an air-current-operated device for producing such current.

2. The combination of a suitable track; a device provided with wheels mounted upon said track; means for blocking one of said wheels on said track; means for holding said blocking means in an inoperative position; means for controlling said holding means; means for actuating said controlling means; and electrical means for rendering said actuating means inoperative.

3. The combination of a suitable track; a device provided with wheels mounted upon said track; means for blocking one of said wheels on said track; a drum; a cable running around said drum and attached to said blocking-means; a pawl for holding said drum; and a solenoid and electrical circuit therefor; said solenoid being operatively related to said pawl so that when the said circuit is broken the solenoid core will be actuated to release said pawl from said drum, whereby the said blocking-means may move into blocking position.

4. The combination of a suitable track; a device provided with wheels mounted upon said track; means for blocking one of said wheels on said track; means for actuating said blocking-means to assume an inoperative position and including an electric motor and circuit therefor; an automatically-operated limit-switch connected with said motor; means for holding said blocking-means in such inoperative position; means for controlling said holding-means; means for actuating said controlling means; and electrical means for rendering said actuating-means inoperative and connected with said motor-circuit.

5. The combination of a suitable track; a device provided with wheels mounted upon said track; means for blocking one of said wheels on said track; a drum; a cable running around said drum and attached to said blocking-means; a pawl for holding said drum; an electric motor for actuating said drum to wind in said cable; a switch in the motor-circuit for limiting the operation of said motor; and a solenoid and circuit therefor; said solenoid being operatively related to said pawl so that when said circuit is broken the solenoid core will be actuated to release said pawl and free said drum, whereby said blocking-means may move into blocking position.

6. The combination of a track; a structure provided with wheels mounted upon said track; a movable blocking device mounted upon said structure and adapted to simultaneously engage said track and two of said wheels; a toggle connecting said device and said structure's frame; and a weight connected with said toggle for actuating the latter by gravity.

7. The combination of a wheeled structure; two depending movable frames each carrying a chocking block; two parallel rock-shafts mounted upon said structure; linkage connecting said shafts and frames respectively; and two gears meshing with each other and secured respectively to said shafts.

8. The combination of a wheeled structure; wheel-chocking means mounted upon said structure; means for actuating said chocking means in one direction; a motor-operated drum mounted upon said structure; a cable wound upon said drum and connected with said chocking means to actuate same in the other direction; and electrically operated means responsive to the action of an air current for unlocking said drum.

9. The combination of a wheeled structure; wheel-chocking means mounted upon said structure; gravity operated means for actuating said chocking means in one direction; a motor-operated drum mounted upon said structure; a cable wound upon said drum and connected with said chocking means to actuate same in the other direction; and means for automatically unlocking said drum, and responsive to the action of an air current.

Signed by me this 1 day of March, 1923.

MICHAEL C. THOMAS.